United States Patent [19]
Vermaerke

[11] Patent Number: 6,007,060
[45] Date of Patent: Dec. 28, 1999

[54] HYDRAULICALLY DAMPING ELASTOMER BEARING

[75] Inventor: Freddy Vermaerke, Troisdorf, Germany

[73] Assignee: Mannesmann Boge GmbH, Bonn, Germany

[21] Appl. No.: 09/066,224

[22] Filed: Apr. 24, 1998

[30] Foreign Application Priority Data

Apr. 24, 1997 [DE] Germany ............................ 197 17 210

[51] Int. Cl.⁶ ...................................................... F16F 5/00
[52] U.S. Cl. .................................... 267/140.12; 267/141.2
[58] Field of Search ............................. 267/140.12, 293, 267/141.2; 16/2.1

[56] References Cited

U.S. PATENT DOCUMENTS 5,509,643  4/1996  Carstens et al. .................... 267/140.12

FOREIGN PATENT DOCUMENTS

4307559 A1  9/1994  Germany ........................... 267/140.12

*Primary Examiner*—Robert J. Oberleitner
*Assistant Examiner*—Devon Kramer
*Attorney, Agent, or Firm*—Cohen, Pontani, Lieberman & Pavane

[57] ABSTRACT

Disclosed is a hydraulically damping elastomer bearing having an outer bearing sleeve, an inner bearing sleeve, and an elastomer body arranged between the inner and outer bearing sleeves. At least one chamber filled with liquid is arranged between the bearing sleeves. A substantially inelastic stop body is arranged in at least one of the chambers and, in the unloaded state of the elastomer bearing, has a predetermined distance to a reference surface. The stop body projects into a cavity of the inner bearing sleeve, and a flow connection runs from the cavity into one of the chambers.

11 Claims, 2 Drawing Sheets

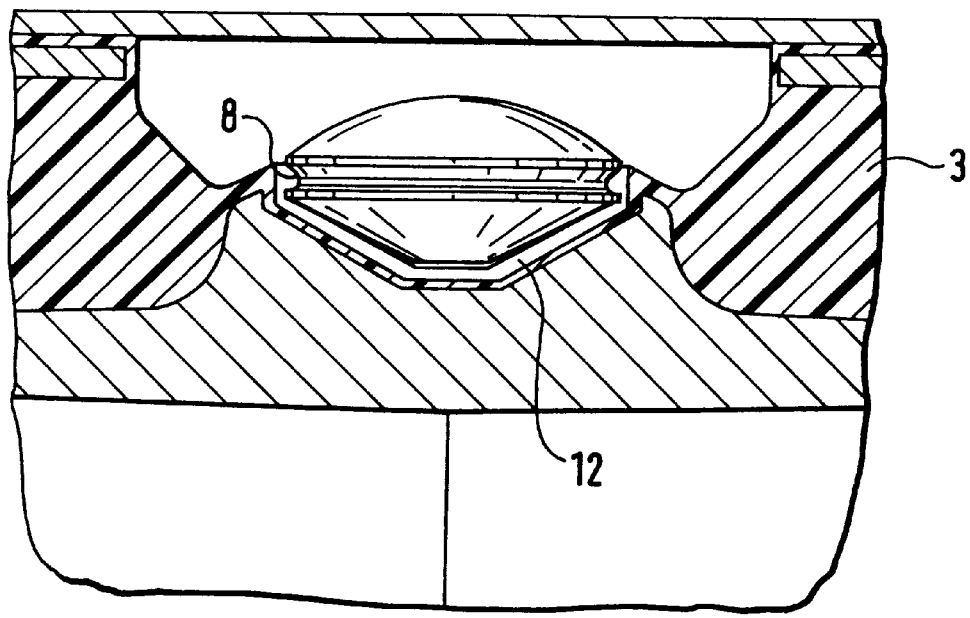
FIG. 3
FIG. 4
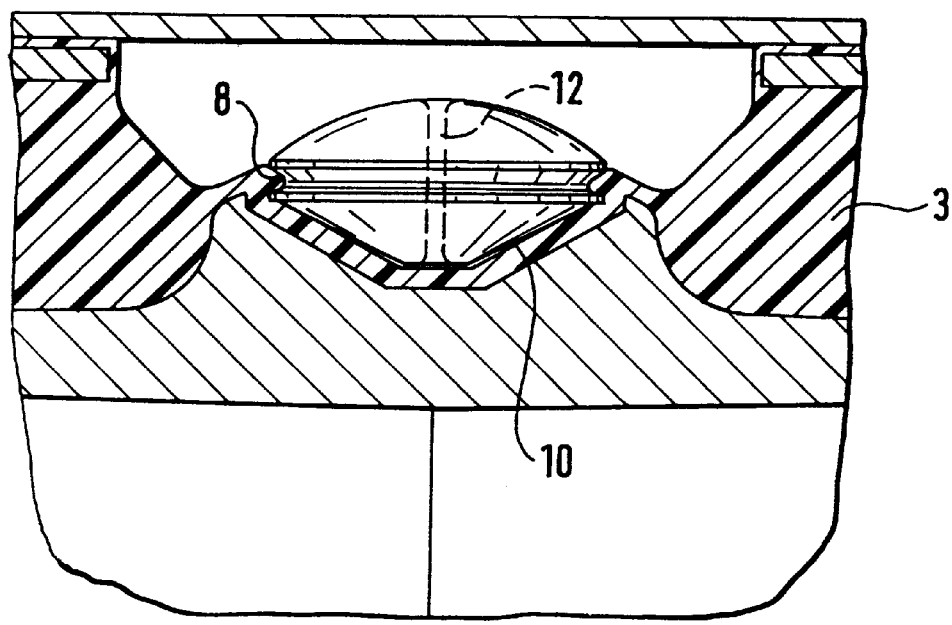

HYDRAULICALLY DAMPING ELASTOMER BEARING

BACKGROUND OF THE INVENTION

The invention relates to a hydraulically damping elastomer bearing with an outer bearing sleeve, an inner bearing sleeve, and an elastomer body arranged between the inner and outer bearing sleeves, whereby at least one chamber filled with liquid is arranged between the bearing sleeves.

Hydraulically damping elastomer bearings in which an elastic element is arranged in an axis-parallel oriented manner between an inner tube and an outer tube are known (DE 40 15 213 A1). The elastic element is connected to the two tubes and has a radially arranged stop body in one of the chambers. The stop body is a metal element and is connected to the inner tube. The stop surfaces have an elastic coating. A disadvantage of this construction is that, after a certain useful life, the elastic surface is destroyed and the metal inner part comes to rest on the outer tube. The object of the present invention is to provide a hydraulically damping elastomer bearing that has a stop body with a long useful life, and which also is securely fixed in the component that carries it.

SUMMARY OF THE INVENTION

The above stated object is obtained, according to the invention. A substantially inelastic stop body that, in the unstressed state of the elastomer bearing, has a preestablished distance to a reference surface, is arranged in at least one of the formed chambers. The stop body extends into a cavity in the inner bearing sleeve, and a flow connection extends from the cavity into one of the chambers.

The use of such a stop body advantageously allows the elastomer bearing to bend in certain directions and remain rigid in other directions in accordance with a certain spring path. The stop body is made of material that does not have the elasticity of an elastomer body. Because the stop, like the entire elastomer bearing, is mounted inside a liquid, it is possible to secure the stop body with precision only if the fluid located in the chamber can escape during the placement of the stop body into a particular cavity. The stop body can then be placed into the cavity without the build up of a counterpressure. This insures proper seating of the stop body throughout its entire useful life.

In a preferred embodiment, the stop body is arranged on the inner bearing sleeve while the reference surface is formed on the inner wall of the outer bearing sleeve. It is advantageous that the stop body, which is inelastic compared to the elastomer body, is not subjected to wear relative to the inner wall of the outer bearing sleeve, as would happen, for example, if the stop body were coated with an elastic layer. The elastic material used for the stop body may be a plastic, for example, but one produced preferably from glycol-resistant material.

In another embodiment, two stop bodies are located on a common transverse axis of the inner bearing sleeve and arranged diametrically opposite to each other.

In a further advantageous embodiment, an elastomer layer is arranged between the stop body and the component (inner bearing sleeve) that carries the stop body, and/or the reference surface located across from the chamber has an elastomer coating.

In yet another embodiment of the invention, a cylindrical cavity is arranged centrally in a depression, on whose cylinder wall there is, at least partially, an elastomer layer.

In a simple embodiment that is advantageous with respect to production technology, at least one flow connection, which extends from approximately the bottom of the cavity into the chamber, is provided in the elastomer layer that extends along the cylinder wall. This measure facilitates precision mounting of the stop body.

In another embodiment, the inner bearing sleeve has sections with a greater wall thickness, in which the depression is arranged.

To attain hydraulic damping between the individual chambers in the radial or axial direction, there is at least one channel by which the chambers are connected to each other.

To avoid cavitation noises in the channel and eliminate sudden stresses, at least one bypass channel, in which a valve that opens at a certain overpressure is arranged, is provided parallel to the channel.

In a further embodiment, the conical surfaces of the depression have the flow connections in the form of a recess.

The various features of novelty which characterize the invention are pointed out with particularity in the claims appended to and forming a part of this specification. For a better understanding of the invention, its operating advantages and specific objects obtained by its use, reference should be had to the accompanying drawings and descriptive matter in which there is illustrated and described a preferred embodiment of the invention.

BRIEF DESCRIPTION OF THE DRAWINGS

FIGS. 3 & 4 each show a stop body mounted in a depression as an individual part.

DETAILED DESCRIPTION OF THE PRESENTLY PREFERRED EMBODIMENTS

Figure 1:
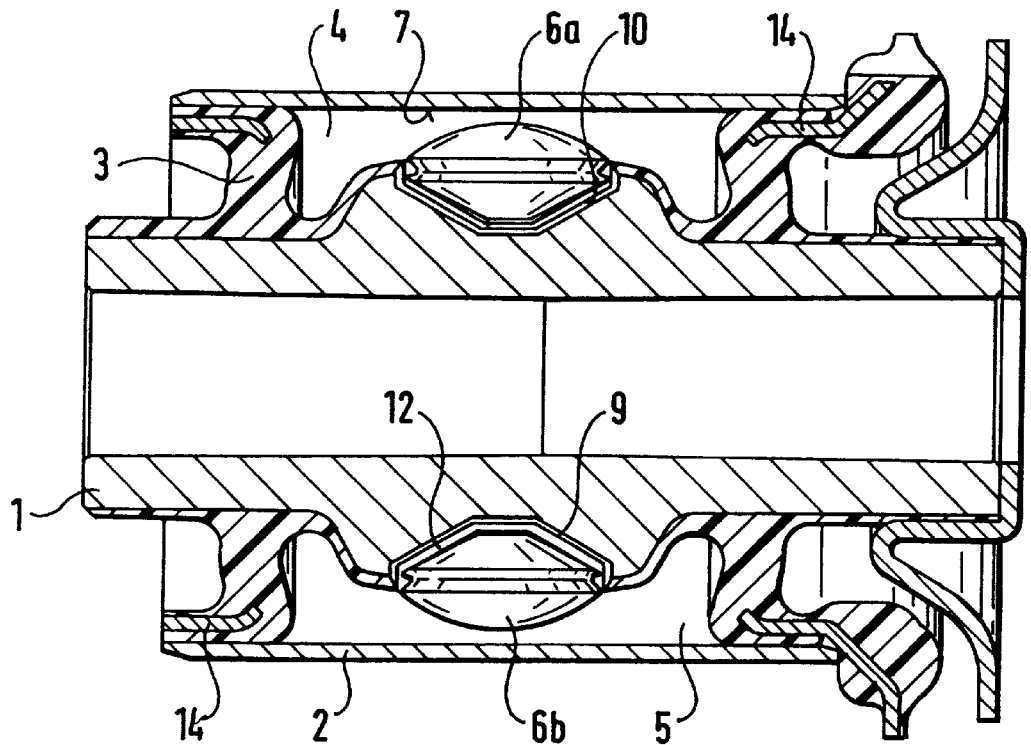
FIGS. 1 & 2 each show in longitudinal section, two views through a hydraulically damping elastomer bearing of the invention.
Figure 2:
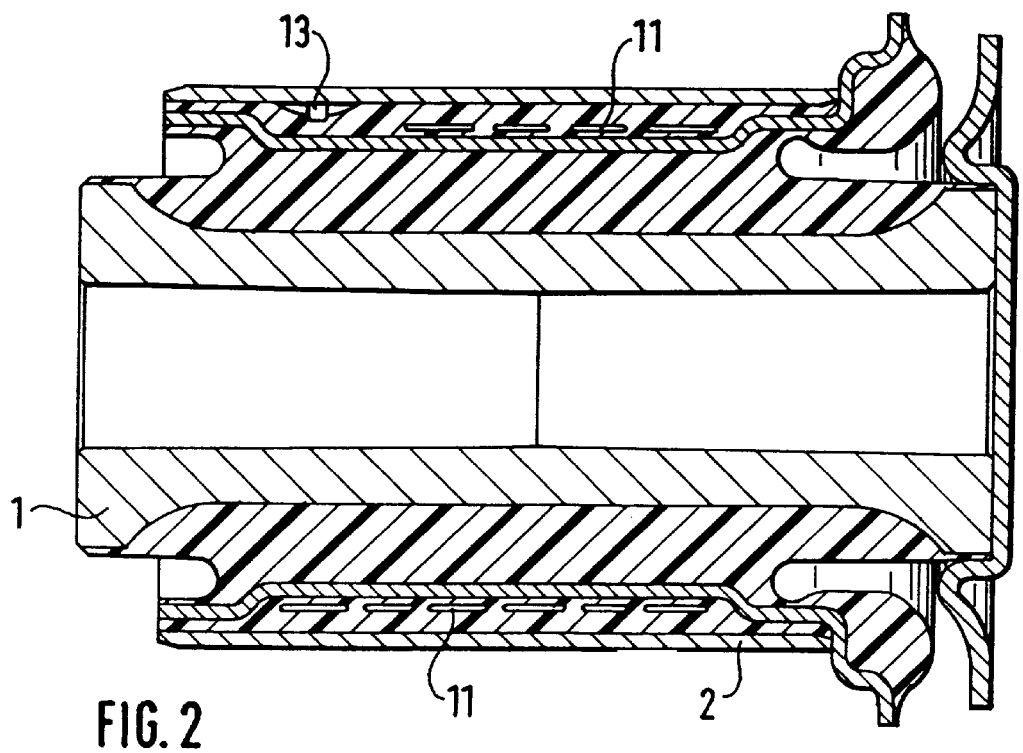

Referring to FIGS. 1 and 2, a hydraulically damping elastomer bearing has an inner bearing sleeve 1, an outer bearing sleeve 2, and an elastomer body 3 arranged between sleeves 1 and 2. The elastomer body 3 is securely connected to the inner bearing sleeve 1 by means of vulcanization, while reinforcement rings 14 are used in the elastomer body 3 for mounting into the outer bearing sleeve 2. The mounting of the inner bearing sleeve 1 together with the elastomer body 3 into the outer bearing sleeve 2 is carried out in a fluid bath. At the same time, chambers 4 and 5 are filled in this fluid bath with a suitable fluid.

Prior to mounting the outer bearing sleeve 2, stop bodies 6a and 6b must be mounted in a region of the inner bearing sleeve 1 embodied as the depression 10. Flow connections 12, which serve to transport fluid away from the cavity 9, avoid an overpressure after the mounting of the stop body 6 in the cavity 9.

For affixation in the cavity 9, each of the stop bodies 6a and 6b has an encircling ring groove 8 (FIG. 3). Material of the elastomer body 3 locks into the ring groove 8 as best seen in FIG. 4.

During operation, the stop body interacts with a reference surface 7 of the outer bearing sleeve 2. The empty space between the exposed surface of the stop body and the reference surface 7 determines the radial deflection or displacement when there is a pressure load in the given pressure direction.

To achieve hydraulic damping, chambers 4 and 5 are connected to each other by a channel, so that, under a pressure load, fluid can flow from one chamber, i.e., 4 into the other chamber 5 in a restricted or damped manner. To avoid cavitation noises in the event of sudden radial stress and to intercept impact stresses, a bypass 13 is connected parallel to the channel 11. The bypass 13 can be equipped with a suitable check valve in a particular flow direction.

FIGS. 3 and 4 show the stop bodies as a detail. FIG. 3 shows an encircling ring groove 8 in the stop body 6 in the area between the cavity 9 and the depression 10. Corresponding material of the elastomer body 3 locks into the groove 8 for flawless locking. The flow connection 12 is worked into the surface of the depression 10 in the form of a recess.

As shown in FIG. 4, the stop body can be embodied as a plastic element. In this case, the material pairing of plastic in the stop body and the outer bearing sleeve 2 avoids screeching noises during contact between the outer bearing sleeve 2 and the stop body. In addition, the stop body has a stable form relative to the elastomer body 3. When the stop body is plastic, various material hardnesses can be used as needed.

The terms and expressions which have been employed are used as terms of description and not of limitation, and there is no intention in the use of such terms and expressions of excluding any equivalent of the features shown and described or portions thereof, it being recognized that various modifications are possible within the scope of the invention.

I claim:

1. A hydraulically damping elastomer bearing comprising:
   an outer bearing sleeve;
   an inner bearing sleeve with a cavity;
   an elastomer body arranged between the inner and outer bearing sleeves;
   at least one chamber formed between the inner and outer bearing sleeves filled with liquid;
   at least one substantially inelastic stop body arranged in at least one of the at least one chambers, and extending into the cavity of the inner bearing sleeve, whereby a flow connection runs from the cavity into said least one chamber and wherein the least one stop body, in an unstressed state of the elastomer bearing is at a preestablished distance to a reference surface.

2. The hydraulically damping elastomer bearing of claim 1 wherein the outer bearing sleeve has an inner wall and the stop body is arranged on the inner bearing sleeve, and the reference surface corresponds with the inner wall of the outer bearing sleeve.

3. The hydraulically damping elastomer bearing of claim 2 wherein the least one stop body comprises two stop bodies, which are located on a common transverse axis of the inner bearing sleeve and are arranged diametrically opposite to each other.

4. The hydraulically damping elastomer bearing of claim 1 wherein an elastomer layer is arranged between the least one stop body and the inner bearing sleeve that carries the stop body.

5. The hydraulically damping elastomer bearing of claim 4 wherein the reference surface has an elastomer coating.

6. The hydraulically damping elastomer bearing of claim 1 wherein the cavity is arranged centrally as a depression.

7. The hydraulically damping elastomer bearing of claim 1 wherein at least one flow connection, which extends approximately from the bottom of the cavity into the chamber, is arranged in a elastomer layer that extends along the cylinder wall.

8. The hydraulically damping elastomer bearing of claim 1 wherein the inner bearing sleeve has a section with a greater wall thickness in which there is a depression.

9. The hydraulically damping elastomer bearing of claim 1 having a plurality of chambers and at least one channel through which the chambers are connected to each other.

10. The hydraulically damping elastomer bearing of claim 9 further comprising at least one bypass channel arranged parallel to the said least one channel.

11. The elastomer bearing of claim 8, wherein the depression has conical surfaces with flow connections in the form of a recess.

* * * * *